United States Patent Office 2,933,498
Patented Apr. 19, 1960

2,933,498
7-AMINOTHIAZOLO-(5,4-d) PYRIMIDINE

George H. Hitchings, Tuckahoe, and Gertrude B. Elion, Bronxville, N.Y., assignors to Burroughs Wellcome & Co. (U.S.A.) Inc., Tuckahoe, N.Y., a corporation of New York No Drawing. Application December 28, 1954
Serial No. 478,200

1 Claim. (Cl. 260—256.5)

The present invention relates to thiazolo(5,4-d) pyrimidines and the method of preparing the same.

In a further aspect, the invention contemplates a novel method of preparing valuable intermediates which are useful in the preparation of 6-mercaptopurine and closely related derivatives having valuable properties in the treatment and alleviation of the symptoms which accompany human leukemias.

Thiazolo (5,4-d) pyrimidines are of interest because of the structural analogy to the imidazolo (5,4-d) pyrimidines (purines). Earlier attempts to prepare the analogues of the natural purines gave examples with additional substituents (e.g. 2-phenyl, 2-methyl, see Falco and Hitchings, J. Am. Chem. Soc., 72, 3203 (1950)) but the methods then employed failed to provide the substances with hydrogen in the 2-position.

In the parent application Serial No. 425,036, now Patent No. 2,721,866, filed April 22, 1954, a method of synthesis of a 6-mercaptopurine from 4,5-diamino-6-mercaptopyrimidine is described. In the reaction of the latter with formic acid there was formed under specified conditions, not the expected 4-amino-5-formamido-6-mercaptopyrimidine but 7-aminothiazolo (5,4-d) pyrimidine. On treatment with alkali the sodium salt of the formamido compound is formed and may be converted to 6-mercaptopurine as described in Serial No. 425,036, now Patent No. 2,721,866. The 7-aminothiazolo (5,4-d) pyrimidine is thus useful as an intermediate in the preparation of 6-mercaptopurine.

The compounds which are the subject of the present invention are represented by the formula

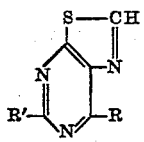

wherein R and R' are selected from the class consisting of amino and hydroxy groups and R' can also be hydrogen. It has been found according to the invention that these compounds may be readily prepared by reaction involving the treatment of a 4,5-diamino-6-mercaptopyrimidine with concentrated formic acid. The resulting thiazolo derivative is then easily converted to 6-mercaptopyrimidine or related compounds by treatment with alkali and subsequent neutralization of the alkali salt of 6-mercaptopurine. The method of the invention may be illustrated as follows:

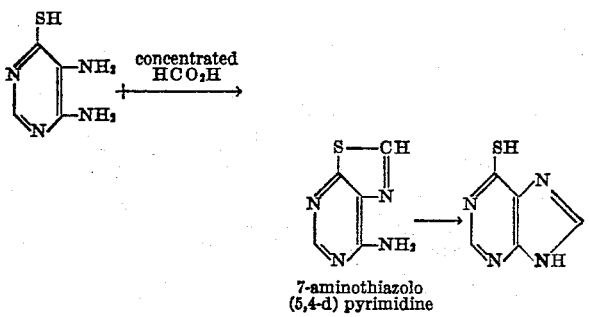

7-aminothiazolo (5,4-d) pyrimidine

The following examples illustrate the methods employed herein and the recovery of the desired compounds.

EXAMPLE I

4,5-diamino-6-mercaptopyrimidine 7.5 grams of 4-amino-6-chloro-5-nitropyrimidine was suspended in 200 ml. of 1 N-potassium hydrosulphide and heated on the steam bath for two hours while passing hydrogen sulphide through the reaction mixture. The reaction mixture was allowed to cool slowly, acidified with 10 N sulphuric acid and chilled. The precipitate consisted of 4,5-diamino-6-mercaptopyrimidine and sulphur. It was boiled with 300 ml. of water, filtered hot and then chilled. The product precipitated as pale yellow needles (4.2 g.); an additional 0.95 g. was obtained by concentration of the mother liquors to 100 ml. The ultraviolet absorption spectrum of 4.5-diamino-6-mercaptopyrimidine shows maxima at 240 and 305 m$\mu$ at pH 1 and at 240 and 310 m$\mu$ at pH 11.

7-amino-thiazolo(5,4-d)-pyrimidine

A mixture of 2 g. of 4,5-diamino-6-mercaptopyrimidine and 10 ml. of 98% formic acid was heated at 70° for two hours and then evaporated to dryness on the steam bath. The residue, 7-amino-thiazolo (5,4-d) pyrimidine has an ultraviolet absorption spectrum completely different from the starting material $\lambda$max.=263 m$\mu$ at pH 1; $\lambda$max.=261 m$\mu$ at pH 11.

6-mercaptopurine

To 820 mg. of 7-amino-thiazolo (5,4-d) pyrimidine was added 2.5 cc. of 2 N sodium hydroxide. The water was removed under reduced pressure. The sodium salt was then heated at 240° for one hour, during which time it melted, gave off water and resolidified. The sodium salt of 6-mercaptopurine was dissolved in 15 ml. of water and acidified to pH 5 with acetic acid. Yellow crystals of 6-mercaptopurine hydrate precipitated. This compound has a characteristic ultraviolet absorption spectrum: $\lambda$max.=325 m$\mu$ at pH 1; $\lambda$max.=232, 312 m$\mu$ at pH 11.

EXAMPLE II

7-aminothiazolo (5,4-d) pyrimidine 9 g. of 4,5-diamino-6-mercaptopyrimidine was allowed to stand with 100 ml. of 98% formic acid for 2 days at room temperature. The mixture was evaporated to dryness on the steam bath and the residue recrystallized from 200 ml. of water, adjusted to pH 7 with ammonium hydroxide. On cooling, colorless needles of 7-aminothiazolo (5,4-d) pyrimidine precipitated, M.P. 214° (yield=7.1 g.). The ultraviolet absorption spectrum shows a single band with $\lambda$max.=263 m$\mu$ at pH 1 and pH 11.

EXAMPLE III

5,7-diaminothiazolo (5,4-d) pyrimidine 0.5 g. of 2,4,5-triamino-6-mercaptopyrimidine was heated with 30 ml. of 98% formic acid at 100° for five hours and the solution was then evaporated to dryness on the steam bath. The residue was suspended in 50 ml. of water and the pH adjusted to 8 with ammonium hydroxide. The insoluble material was removed by filtration. The 5,7-diaminothiazolo (5,4-d) pyrimidine which was obtained by evaporation of the aqueous filtrate to dryness, and extraction of the residue with 50 ml. of ethyl alcohol. Evaporation of the alcoholic solution gave 5,7-diaminothiazolo (5,4-d) pyrimidine which shows the following ultraviolet absorption spectrum: $\lambda$max.=265 m$\mu$ at pH 1 and $\lambda$max.=285 m$\mu$ at pH 11.

EXAMPLE IV

*5,7-dihydroxythiazolo (5,4-d) pyrimidine*

A suspension of 100 mg. of 2,4-dihydroxy-5-amino-6-mercaptopyrimidine in 15 ml. of 98–100% formic acid was heated on the steam bath for four hours. The mixture was then evaporated to dryness, and the residue dissolved in 20 ml. of 0.2 N sodium hydroxide. The alkaline solution was filtered and acidified to pH 5 with glacial acetic acid. The crystalline precipitate of 5,7-dihydroxythiazolo (5,4-d) pyrimidine has an ultraviolet absorption spectrum with λmax.=248 mμ at pH 1 and λmax.=285 at pH 11.

EXAMPLE V

*7-hydroxythiazolo (5,4-d) pyridine*

3 g. of 7-aminothiazolo (5,4-d) pyrimidine was dissolved in 40 ml. of 1 N hydrochloric acid. The solution was heated to 50° and a solution of 1.5 g. of sodium nitrite in 10 ml. of water was added dropwise in the course of 10 minutes, as the temperature was gradually raised to 90°. The mixture was kept at 90–95° for another 5 minutes, cooled and the acidity was adjusted to pH 4 by additon of 10 ml. of 2 N sodium hydroxide. The precipitate of 7-hydroxythiazolo (5,4-d) pyrimidine (1.9 g.) was filtered off and recrystallized from 20 ml. of hot water. The product has an ultraviolet absorption spectrum with a λmax. at 258 mμ at pH 1 and pH 11.

We claim:

7-aminothiazolo (5,4-d)-pyrimidine.

No references cited.